(12) United States Patent
Bidgoli et al.

(10) Patent No.: US 11,784,838 B2
(45) Date of Patent: Oct. 10, 2023

(54) MULTICAST BASED ON PENULTIMATE HOP POPPING

(71) Applicant: Nokia Solutions and Networks Oy, Espoo (FI)

(72) Inventors: Hooman Bidgoli, Ottawa (CA); Jayant Kotalwar, Cupertino, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/966,099

(22) Filed: Oct. 14, 2022

(65) Prior Publication Data
US 2023/0030537 A1    Feb. 2, 2023

Related U.S. Application Data

(63) Continuation of application No. 16/296,482, filed on Mar. 8, 2019, now abandoned.

(51) Int. Cl.
*H04L 12/18*      (2006.01)
*H04L 45/16*      (2022.01)
(Continued)

(52) U.S. Cl.
CPC ............. *H04L 12/18* (2013.01); *H04L 45/16* (2013.01); *H04L 45/48* (2013.01); *H04L 45/507* (2013.01);
(Continued)

(58) Field of Classification Search
CPC ......... H04L 12/18; H04L 45/16; H04L 45/48; H04L 45/507; H04L 45/52; H04L 45/586; H04L 5/52
See application file for complete search history.

(56) References Cited

U.S. PATENT DOCUMENTS 7,489,695 B1 *  2/2009  Ayyangar ............... H04L 47/724
                                                               370/396
7,519,010 B1    4/2009  Aggarwal et al.
(Continued)

OTHER PUBLICATIONS

Voyer, D., et al., "SR Replication Policy for P2MP Service Delivery," draft-voyer-spring-sr-p2mp-policy-01, Network Working Group, Oct. 22, 2018, 9 pages.
(Continued)

*Primary Examiner* — Brenda H Pham
(74) *Attorney, Agent, or Firm* — Tong, Rea, Bentley & Kim, LLC

(57) ABSTRACT

Various example embodiments for supporting multicast are presented. Various example embodiments for supporting multicast are configured to support multicast, on a multicast tree for a multicast group, based on use of penultimate hop popping (PHP) on the multicast tree. Various example embodiments for supporting multicast are configured to support multicast, on a multicast tree for a multicast group, based on use of PHP on the multicast tree where the multicast tree is Point-to-Multipoint (P2MP) Multiprotocol Label Switching (MPLS) tree that is formed based on a TREE-SID multicast solution (although it will be appreciated that PHP may be applied on other types of multicast trees (e.g., other than P2MP MPLS multicast trees), on multicast trees formed based on other multicast solutions (e.g., other than TREE-SID), or the like, as well as various combinations thereof).

18 Claims, 6 Drawing Sheets

(51) Int. Cl.
*H04L 45/48* (2022.01)
*H04L 45/50* (2022.01)
*H04L 45/52* (2022.01)
*H04L 45/586* (2022.01)
*H04L 45/60* (2022.01)

(52) U.S. Cl.
CPC ............ *H04L 45/52* (2013.01); *H04L 45/586* (2013.01); *H04L 45/60* (2013.01)

(56) References Cited

U.S. PATENT DOCUMENTS

| | | |
|---|---|---|
| 8,310,957 B1 | 11/2012 | Rekhter |
| 10,158,558 B1 | 12/2018 | Ward et al. |
| 2005/0169270 A1* | 8/2005 | Mutou ................ H04L 12/4641 |
| | | 370/395.2 |
| 2008/0123650 A1 | 5/2008 | Bhaskar |
| 2016/0254988 A1* | 9/2016 | Eckert .................... H04L 45/28 |
| | | 370/390 |
| 2018/0324090 A1* | 11/2018 | Duncan ............... H04L 12/4641 |
| 2020/0120020 A1* | 4/2020 | Dutta ..................... H04L 45/04 |

OTHER PUBLICATIONS

Rosen, E., et al., "Multicast in MPLS/BGP IP VPNs," Internet Engineering Task Force, RFC 6513, Feb. 2012, 88 pages.
Aggarwal, R., et al., "Multicast in Virtual Private LAN Service (VPLS)," Internet Engineering Task Force, RFC 7117, Feb. 2014, 50 pages.

* cited by examiner

MULTICAST BASED ON PENULTIMATE HOP POPPING

CROSS-REFERENCE TO RELATED APPLICATIONS

This application is a continuation of U.S. patent application Ser. No. 16/296,482, filed on Mar. 8, 2019, and entitled MULTICAST BASED ON PENULTIMATE HOP POPPING, which is hereby incorporated by reference herein in its entirety.

TECHNICAL FIELD

Various example embodiments relate generally to communication systems, more particularly but not exclusively, to multicast communications in communication systems.

BACKGROUND

Multicast is used in many types of communication networks to deliver various types of information. Multicast may be implemented in various ways, in terms of both multicast tree establishment and multicast forwarding over multicast trees using various architectures, protocols, or the like.

SUMMARY

In at least some example embodiments, an apparatus includes at least one processor and at least one memory including program code, wherein the at least one memory and the program code are configured to, with the at least one processor, cause the apparatus to at least determine a multicast tree for a multicast group, wherein the multicast tree includes a root router, a set of transit routers, and a set of leaf routers and establish the multicast tree based on an indication that penultimate hop popping (PHP) is to be used on the multicast tree. In at least some example embodiments, to determine the multicast tree, the at least one memory and the program code are configured to, with the at least one processor, cause the apparatus to at least receive network topology information from the communication network, receive multicast tree root and leaf information identifying the root router and the set of leaf routers, and calculate the multicast tree from the root router to the set of leaf routers based on the network topology information and the multicast tree root and leaf information. In at least some example embodiments, the multicast tree root and leaf information is received from the root router. In at least some example embodiments, to establish the multicast tree based on an indication that PHP is to be used on the multicast tree, the at least one memory and the program code are configured to, with the at least one processor, cause the apparatus to at least determine multicast tree configuration information for the root router and the transit routers and send the multicast tree configuration information toward the root router and the transit routers. In at least some example embodiments, to establish the multicast tree based on an indication that PHP is to be used on the multicast tree, the at least one memory and the program code are configured to, with the at least one processor, cause the apparatus to at least identify, from the set of transit routers, one or more penultimate hop (PH) routers of the multicast tree and send, toward each of the one or more PH routers of the multicast tree, respective multicast tree configuration information indicative that the respective PH router is to remove a tree label of the multicast tree from multicast packets on the multicast tree before forwarding the multicast packets via the multicast tree. In at least some example embodiments, for at least one of the PH routers of the multicast tree, the multicast tree configuration information includes a rule indicative that the tree label of the multicast tree is to be swapped with an implicit null label.

In at least some example embodiments, a non-transitory computer-readable medium includes instructions configured to cause an apparatus to at least determine a multicast tree for a multicast group, wherein the multicast tree includes a root router, a set of transit routers, and a set of leaf routers and establish the multicast tree based on an indication that penultimate hop popping (PHP) is to be used on the multicast tree. In at least some example embodiments, to determine the multicast tree, the non-transitory computer-readable medium includes instructions configured to cause the apparatus to at least receive network topology information from the communication network, receive multicast tree root and leaf information identifying the root router and the set of leaf routers, and calculate the multicast tree from the root router to the set of leaf routers based on the network topology information and the multicast tree root and leaf information. In at least some example embodiments, the multicast tree root and leaf information is received from the root router. In at least some example embodiments, to establish the multicast tree based on an indication that PHP is to be used on the multicast tree, the non-transitory computer-readable medium includes instructions configured to cause the apparatus to at least determine multicast tree configuration information for the root router and the transit routers and send the multicast tree configuration information toward the root router and the transit routers. In at least some example embodiments, to establish the multicast tree based on an indication that PHP is to be used on the multicast tree, the non-transitory computer-readable medium includes instructions configured to cause the apparatus to at least identify, from the set of transit routers, one or more penultimate hop (PH) routers of the multicast tree and send, toward each of the one or more PH routers of the multicast tree, respective multicast tree configuration information indicative that the respective PH router is to remove a tree label of the multicast tree from multicast packets on the multicast tree before forwarding the multicast packets via the multicast tree. In at least some example embodiments, for at least one of the PH routers of the multicast tree, the multicast tree configuration information includes a rule indicative that the tree label of the multicast tree is to be swapped with an implicit null label.

In at least some example embodiments, a method includes determining a multicast tree for a multicast group, wherein the multicast tree includes a root router, a set of transit routers, and a set of leaf routers and establishing the multicast tree based on an indication that penultimate hop popping (PHP) is to be used on the multicast tree. In at least some example embodiments, determining the multicast tree includes receiving network topology information from the communication network, receiving multicast tree root and leaf information identifying the root router and the set of leaf routers, and calculating the multicast tree from the root router to the set of leaf routers based on the network topology information and the multicast tree root and leaf information. In at least some example embodiments, the multicast tree root and leaf information is received from the root router. In at least some example embodiments, establishing the multicast tree based on an indication that PHP is to be used on the multicast tree includes determining multicast tree configuration information for the root router and the transit routers and sending the multicast tree configuration information toward the root router and the transit routers. In at least some example embodiments, establishing the multicast tree based on an indication that PHP is to be used on the multicast tree includes identifying, from the set of transit routers, one or more penultimate hop (PH) routers of the multicast tree and sending, toward each of the one or more PH routers of the multicast tree, respective multicast tree configuration information indicative that the respective PH router is to remove a tree label of the multicast tree from multicast packets on the multicast tree before forwarding the multicast packets via the multicast tree. In at least some example embodiments, for at least one of the PH routers of the multicast tree, the multicast tree configuration information includes a rule indicative that the tree label of the multicast tree is to be swapped with an implicit null label.

In at least some example embodiments, an apparatus includes means for determining a multicast tree for a multicast group, wherein the multicast tree includes a root router, a set of transit routers, and a set of leaf routers and means for establishing the multicast tree based on an indication that penultimate hop popping (PHP) is to be used on the multicast tree. In at least some example embodiments, the means for determining the multicast tree includes means for receiving network topology information from the communication network, means for receiving multicast tree root and leaf information identifying the root router and the set of leaf routers, and means for calculating the multicast tree from the root router to the set of leaf routers based on the network topology information and the multicast tree root and leaf information. In at least some example embodiments, the multicast tree root and leaf information is received from the root router. In at least some example embodiments, the means for establishing the multicast tree based on an indication that PHP is to be used on the multicast tree includes means for determining multicast tree configuration information for the root router and the transit routers and means for sending the multicast tree configuration information toward the root router and the transit routers. In at least some example embodiments, the means for establishing the multicast tree based on an indication that PHP is to be used on the multicast tree includes means for identifying, from the set of transit routers, one or more penultimate hop (PH) routers of the multicast tree and means for sending, toward each of the one or more PH routers of the multicast tree, respective multicast tree configuration information indicative that the respective PH router is to remove a tree label of the multicast tree from multicast packets on the multicast tree before forwarding the multicast packets via the multicast tree. In at least some example embodiments, for at least one of the PH routers of the multicast tree, the multicast tree configuration information includes a rule indicative that the tree label of the multicast tree is to be swapped with an implicit null label.

In at least some example embodiments, an apparatus includes at least one processor and at least one memory including program code, wherein the at least one memory and the program code are configured to, with the at least one processor, cause the apparatus to at least determine, by a root router of a multicast tree, that penultimate hop popping (PHP) is to be used on the multicast tree and send, by the root router toward a controller, an indication that PHP is to be used on the multicast tree. In at least some example embodiments, the at least one memory and the program code are configured to, with the at least one processor, cause the apparatus to at least determine, by the root router of the multicast tree, that it is to operate as the root router of the multicast tree and send, by the root router toward the controller, an indication that it is to operate as the root router of the multicast tree. In at least some example embodiments, the at least one memory and the program code are configured to, with the at least one processor, cause the apparatus to at least discover, by the root router, one or more leaf routers of the multicast tree and send, by the root router toward the controller, an indication of the one or more leaf routers of the multicast tree. In at least some example embodiments, the one or more leaf routers of the multicast tree are discovered based on use of Multi-protocol BGP (MP-BGP) in conjunction with Multicast Virtual Private Network (MVPN) procedures. In at least some example embodiments, the one or more leaf routers of the multicast tree are discovered based on MP-BGP LEAF auto-discovery (AD) routes arriving at the root router from the one or more leaf routers. In at least some example embodiments, the at least one memory and the program code are configured to, with the at least one processor, cause the apparatus to at least advertise, by the root router to the one or more leaf routers, a label identifying a virtual routing and forwarding (VRF) instance of the multicast tree. In at least some example embodiments, the label identifying the VRF instance of the multicast tree is advertised using a label field in a Provider Multicast Service Interface (PMSI) Tunnel Attribute (PTA).

In at least some example embodiments, a non-transitory computer-readable medium includes instructions configured to cause an apparatus to at least determine, by a root router of a multicast tree, that penultimate hop popping (PHP) is to be used on the multicast tree and send, by the root router toward a controller, an indication that PHP is to be used on the multicast tree. In at least some example embodiments, the non-transitory computer-readable medium includes instructions configured to cause the apparatus to at least determine, by the root router of the multicast tree, that it is to operate as the root router of the multicast tree and send, by the root router toward the controller, an indication that it is to operate as the root router of the multicast tree. In at least some example embodiments, the non-transitory computer-readable medium includes instructions configured to cause the apparatus to at least discover, by the root router, one or more leaf routers of the multicast tree and send, by the root router toward the controller, an indication of the one or more leaf routers of the multicast tree. In at least some example embodiments, the one or more leaf routers of the multicast tree are discovered based on use of Multi-protocol BGP (MP-BGP) in conjunction with Multicast Virtual Private Network (MVPN) procedures. In at least some example embodiments, the one or more leaf routers of the multicast tree are discovered based on MP-BGP LEAF auto-discovery (AD) routes arriving at the root router from the one or more leaf routers. In at least some example embodiments, the non-transitory computer-readable medium includes instructions configured to cause the apparatus to at least advertise, by the root router to the one or more leaf routers, a label identifying a virtual routing and forwarding (VRF) instance of the multicast tree. In at least some example embodiments, the label identifying the VRF instance of the multicast tree is advertised using a label field in a Provider Multicast Service Interface (PMSI) Tunnel Attribute (PTA).

In at least some example embodiments, a method includes determining, by a root router of a multicast tree, that penultimate hop popping (PHP) is to be used on the multicast tree and sending, by the root router toward a controller, an indication that PHP is to be used on the multicast tree. In at least some example embodiments, the method includes determining, by the root router of the multicast tree, that it is to operate as the root router of the multicast tree and sending, by the root router toward the controller, an indication that it is to operate as the root router of the multicast tree. In at least some example embodiments, the method includes discovering, by the root router, one or more leaf routers of the multicast tree and sending, by the root router toward the controller, an indication of the one or more leaf routers of the multicast tree. In at least some example embodiments, the one or more leaf routers of the multicast tree are discovered based on use of Multi-protocol BGP (MP-BGP) in conjunction with Multicast Virtual Private Network (MVPN) procedures. In at least some example embodiments, the one or more leaf routers of the multicast tree are discovered based on MP-BGP LEAF auto-discovery (AD) routes arriving at the root router from the one or more leaf routers. In at least some example embodiments, the method includes advertising, by the root router to the one or more leaf routers, a label identifying a virtual routing and forwarding (VRF) instance of the multicast tree. In at least some example embodiments, the label identifying the VRF instance of the multicast tree is advertised using a label field in a Provider Multicast Service Interface (PMSI) Tunnel Attribute (PTA).

In at least some example embodiments, an apparatus includes means for determining, by a root router of a multicast tree, that penultimate hop popping (PHP) is to be used on the multicast tree and sending, by the root router toward a controller, an indication that PHP is to be used on the multicast tree. In at least some example embodiments, the apparatus includes means for determining, by the root router of the multicast tree, that it is to operate as the root router of the multicast tree and means for sending, by the root router toward the controller, an indication that it is to operate as the root router of the multicast tree. In at least some example embodiments, the apparatus includes means for discovering, by the root router, one or more leaf routers of the multicast tree and means for sending, by the root router toward the controller, an indication of the one or more leaf routers of the multicast tree. In at least some example embodiments, the one or more leaf routers of the multicast tree are discovered based on use of Multi-protocol BGP (MP-BGP) in conjunction with Multicast Virtual Private Network (MVPN) procedures. In at least some example embodiments, the one or more leaf routers of the multicast tree are discovered based on MP-BGP LEAF auto-discovery (AD) routes arriving at the root router from the one or more leaf routers. In at least some example embodiments, the apparatus includes means for advertising, by the root router to the one or more leaf routers, a label identifying a virtual routing and forwarding (VRF) instance of the multicast tree. In at least some example embodiments, the label identifying the VRF instance of the multicast tree is advertised using a label field in a Provider Multicast Service Interface (PMSI) Tunnel Attribute (PTA).

In at least some example embodiments, an apparatus includes at least one processor and at least one memory including program code, wherein the at least one memory and the program code are configured to, with the at least one processor, cause the apparatus to at least receive, by a penultimate hop (PH) router of a multicast tree, a multicast packet including a tree label identifying the multicast tree, an upstream assigned label, and a multicast payload, remove, by the PH router, the tree label from the multicast packet to form a modified multicast packet, and send, by the PH router toward one or more leaf routers of the multicast tree via the multicast tree, the modified multicast packet. In at least some example embodiments, the tree label is removed from the multicast packet by popping the tree label from the multicast packet. In at least some example embodiments, the tree label is popped from the multicast packet based on a rule indicative that the tree label is to be swapped with an implicit null label. In at least some example embodiments, the rule indicative that the tree label is to be swapped with the implicit null label is received from a controller. In at least some example embodiments, the upstream assigned label maps to a virtual routing and forwarding (VRF) instance of the multicast tree. In at least some example embodiments, the upstream assigned label is a Border Gateway Protocol (BGP) Provider Multicast Service Interface (PMSI) Tunnel Attribute (PTA) label.

In at least some example embodiments, a non-transitory computer-readable medium includes instructions configured to cause an apparatus to at least receive, by a penultimate hop (PH) router of a multicast tree, a multicast packet including a tree label identifying the multicast tree, an upstream assigned label, and a multicast payload, remove, by the PH router, the tree label from the multicast packet to form a modified multicast packet, and send, by the PH router toward one or more leaf routers of the multicast tree via the multicast tree, the modified multicast packet. In at least some example embodiments, the tree label is removed from the multicast packet by popping the tree label from the multicast packet. In at least some example embodiments, the tree label is popped from the multicast packet based on a rule indicative that the tree label is to be swapped with an implicit null label. In at least some example embodiments, the rule indicative that the tree label is to be swapped with the implicit null label is received from a controller. In at least some example embodiments, the upstream assigned label maps to a virtual routing and forwarding (VRF) instance of the multicast tree. In at least some example embodiments, the upstream assigned label is a Border Gateway Protocol (BGP) Provider Multicast Service Interface (PMSI) Tunnel Attribute (PTA) label.

In at least some example embodiments, a method includes receiving, by a penultimate hop (PH) router of a multicast tree, a multicast packet including a tree label identifying the multicast tree, an upstream assigned label, and a multicast payload, removing, by the PH router, the tree label from the multicast packet to form a modified multicast packet, and sending, by the PH router toward one or more leaf routers of the multicast tree via the multicast tree, the modified multicast packet. In at least some example embodiments, the tree label is removed from the multicast packet by popping the tree label from the multicast packet. In at least some example embodiments, the tree label is popped from the multicast packet based on a rule indicative that the tree label is to be swapped with an implicit null label. In at least some example embodiments, the rule indicative that the tree label is to be swapped with the implicit null label is received from a controller. In at least some example embodiments, the upstream assigned label maps to a virtual routing and forwarding (VRF) instance of the multicast tree. In at least some example embodiments, the upstream assigned label is a Border Gateway Protocol (BGP) Provider Multicast Service Interface (PMSI) Tunnel Attribute (PTA) label.

In at least some example embodiments, an apparatus includes means for receiving, by a penultimate hop (PH) router of a multicast tree, a multicast packet including a tree label identifying the multicast tree, an upstream assigned label, and a multicast payload, means for removing, by the PH router, the tree label from the multicast packet to form a modified multicast packet, and means for sending, by the PH router toward one or more leaf routers of the multicast tree via the multicast tree, the modified multicast packet. In at least some example embodiments, the tree label is removed from the multicast packet by popping the tree label from the multicast packet. In at least some example embodiments, the tree label is popped from the multicast packet based on a rule indicative that the tree label is to be swapped with an implicit null label. In at least some example embodiments, the rule indicative that the tree label is to be swapped with the implicit null label is received from a controller. In at least some example embodiments, the upstream assigned label maps to a virtual routing and forwarding (VRF) instance of the multicast tree. In at least some example embodiments, the upstream assigned label is a Border Gateway Protocol (BGP) Provider Multicast Service Interface (PMSI) Tunnel Attribute (PTA) label.

In at least some example embodiments, an apparatus includes at least one processor and at least one memory including program code, wherein the at least one memory and the program code are configured to, with the at least one processor, cause the apparatus to at least receive, by a leaf router of a multicast tree from a penultimate hop router of the multicast tree, a multicast packet including a multicast payload and having an upstream assigned label as an outer label and determine, by the leaf router based on the upstream assigned label and the multicast payload, forwarding of the multicast payload from the leaf router. In at least some example embodiments, the multicast packet is received without a tree label identifying the multicast tree. In at least some example embodiments, to determine forwarding of the multicast payload from the leaf router, the at least one memory and the program code are configured to, with the at least one processor, cause the apparatus to at least identify, based on the upstream assigned label, a virtual routing and forwarding (VRF) instance of the multicast tree and identify, based on the VFR instance for the multicast tree and a header of the multicast payload, one or more outgoing interfaces of the leaf router via which the multicast payload is to be forwarded. In at least some example embodiments, the one or more outgoing interface of the leaf router are identified based on an Internet Protocol (IP) header of the multicast payload. In at least some example embodiments, a mapping of the upstream assigned label to the VRF instance of the multicast tree is received from a root router of the multicast tree. In at least some example embodiments, the mapping of the upstream assigned label to the VRF instance of the multicast tree is received in a label field in a Border Gateway Protocol (BGP) Provider Multicast Service Interface (PMSI) Tunnel Attribute (PTA).

In at least some example embodiments, a non-transitory computer-readable medium includes instructions configured to cause an apparatus to at least receive, by a leaf router of a multicast tree from a penultimate hop router of the multicast tree, a multicast packet including a multicast payload and having an upstream assigned label as an outer label and determine, by the leaf router based on the upstream assigned label and the multicast payload, forwarding of the multicast payload from the leaf router. In at least some example embodiments, the multicast packet is received without a tree label identifying the multicast tree. In at least some example embodiments, to determine forwarding of the multicast payload from the leaf router, the non-transitory computer-readable medium includes instructions configured to cause the apparatus to at least identify, based on the upstream assigned label, a virtual routing and forwarding (VRF) instance of the multicast tree and identify, based on the VFR instance for the multicast tree and a header of the multicast payload, one or more outgoing interfaces of the leaf router via which the multicast payload is to be forwarded. In at least some example embodiments, the one or more outgoing interface of the leaf router are identified based on an Internet Protocol (IP) header of the multicast payload. In at least some example embodiments, a mapping of the upstream assigned label to the VRF instance of the multicast tree is received from a root router of the multicast tree. In at least some example embodiments, the mapping of the upstream assigned label to the VRF instance of the multicast tree is received in a label field in a Border Gateway Protocol (BGP) Provider Multicast Service Interface (PMSI) Tunnel Attribute (PTA).

In at least some example embodiments, a method includes receiving, by a leaf router of a multicast tree from a penultimate hop router of the multicast tree, a multicast packet including a multicast payload and having an upstream assigned label as an outer label and determining, by the leaf router based on the upstream assigned label and the multicast payload, forwarding of the multicast payload from the leaf router. In at least some example embodiments, the multicast packet is received without a tree label identifying the multicast tree. In at least some example embodiments, determining forwarding of the multicast payload from the leaf router includes identifying, based on the upstream assigned label, a virtual routing and forwarding (VRF) instance of the multicast tree and identifying, based on the VFR instance for the multicast tree and a header of the multicast payload, one or more outgoing interfaces of the leaf router via which the multicast payload is to be forwarded. In at least some example embodiments, the one or more outgoing interface of the leaf router are identified based on an Internet Protocol (IP) header of the multicast payload. In at least some example embodiments, a mapping of the upstream assigned label to the VRF instance of the multicast tree is received from a root router of the multicast tree. In at least some example embodiments, the mapping of the upstream assigned label to the VRF instance of the multicast tree is received in a label field in a Border Gateway Protocol (BGP) Provider Multicast Service Interface (PMSI) Tunnel Attribute (PTA).

In at least some example embodiments, an apparatus includes means for receiving, by a leaf router of a multicast tree from a penultimate hop router of the multicast tree, a multicast packet including a multicast payload and having an upstream assigned label as an outer label and means for determining, by the leaf router based on the upstream assigned label and the multicast payload, forwarding of the multicast payload from the leaf router. In at least some example embodiments, the multicast packet is received without a tree label identifying the multicast tree. In at least some example embodiments, the means for determining forwarding of the multicast payload from the leaf router includes means for identifying, based on the upstream assigned label, a virtual routing and forwarding (VRF) instance of the multicast tree and means for identifying, based on the VFR instance for the multicast tree and a header of the multicast payload, one or more outgoing interfaces of the leaf router via which the multicast payload is to be forwarded. In at least some example embodiments, the one or more outgoing interface of the leaf router are identified based on an Internet Protocol (IP) header of the multicast payload. In at least some example embodiments, a mapping of the upstream assigned label to the VRF instance of the multicast tree is received from a root router of the multicast tree. In at least some example embodiments, the mapping of the upstream assigned label to the VRF instance of the multicast tree is received in a label field in a Border Gateway Protocol (BGP) Provider Multicast Service Interface (PMSI) Tunnel Attribute (PTA).

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
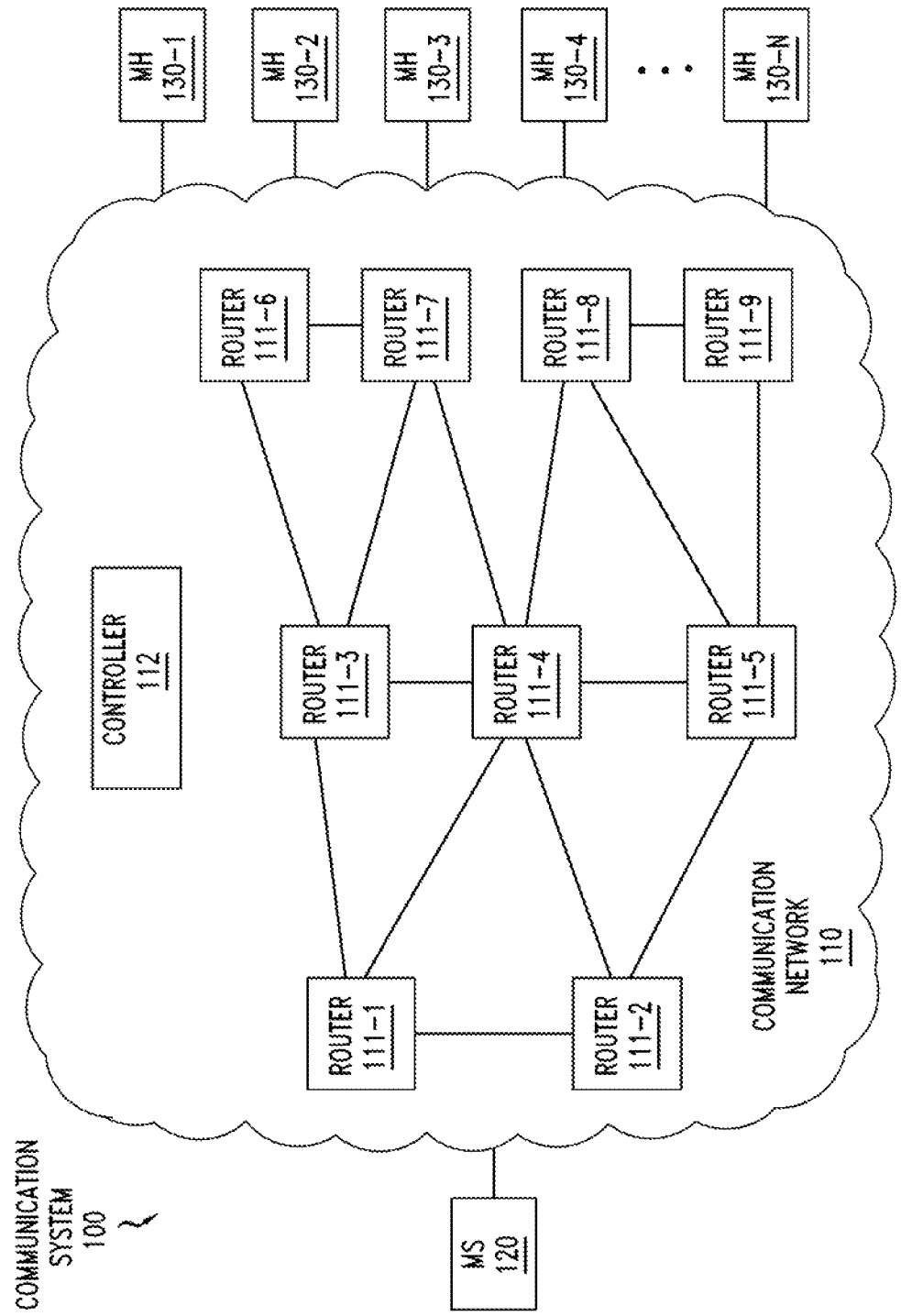
FIG. 1 depicts an example embodiment of a communication system configured to support use of multicast for delivery of data based on use of a version of TREE-SID in which PHP is used.

Various example embodiments for supporting multicast are presented. Various example embodiments for supporting multicast are configured to support multicast, on a multicast tree for a multicast group, based on use of penultimate hop popping (PHP) on the multicast tree where the multicast tree is Point-to-Multipoint (P2MP) Multiprotocol Label Switching (MPLS) tree that is formed based on the TREE-SID multicast solution (although it will be appreciated that PHP may be applied on other types of multicast trees (e.g., other than P2MP MPLS multicast trees), on multicast trees formed based on other multicast solutions (e.g., other than TREE-SID), or the like, as well as various combinations thereof). In at least some example embodiments, where the multicast tree is formed based on the TREE-SID multicast solution (e.g., in which a Path Computation Element (PCE) computes a multicast tree and downloads the multicast tree to Path Computation Clients (PCCs) of the multicast tree), PHP may be used by PCC operating as PH routers in the multicast tree in order to obviate a need for the PCE to download the multicast tree to PCCs operating as leaf routers in the multicast tree and, thus, in order to obviate a need for the PCCs operating as leaf routers in the multicast tree to receive and process configuration information of the multicast tree from the PCE or to perform popping of the tree label (e.g., the TREE-SID transport label where TREE-SID is used) on multicast packets received at the PCCs operating as leaf routers in the multicast tree. In at least some example embodiments, where the multicast tree is formed based on the TREE-SID multicast solution, for a given multicast packet that includes a multicast payload (e.g., an Internet Protocol (IP) packet, an Ethernet frame, or the like) and that includes a label stack (e.g., an MPLS label stack or other suitable label stack) having an upstream assigned label (e.g., a Border Gateway Protocol (BGP) Provider Multicast Service Interface (PMSI) Tunnel Attribute (PTA) label signaled through BGP auto-discovery (AD) routes, which may be referred to as a BGP PTA upstream assigned label, or other suitable label) on the multicast payload and a tree label (e.g., a the TREE-SID transport label where TREE-SID is used) on the upstream assigned label, PHP procedures may be used on the PH routers of the multicast tree to remove the tree label from the multicast packet and forward the multicast packet to the leaf router(s) of the multicast tree for handling of the multicast packet by the leaf router(s) of the multicast tree based on the upstream assigned label and the multicast payload. In at least some example embodiments, where the multicast tree is formed based on the TREE-SID multicast solution, when a multicast packet including a multicast payload, an upstream assigned label (e.g., a BGP PTA upstream assigned label), and a tree label (e.g., a the TREE-SID transport label where TREE-SID is used) is received by a PH router of the multicast tree, PHP procedures may be used on the PH router of the multicast tree to remove the tree label from the multicast packet and forward the multicast packet to the leaf router with the upstream assigned label as the outer label on the multicast payload (e.g., with the upstream assigned label at the top of the label stack). In at least some example embodiments, where the multicast tree is formed based on the TREE-SID multicast solution, the PCE will assign an implicit NULL label (e.g., label 3) for the outgoing label to the PH routers of the multicast tree, which will trigger the PH routers of the multicast tree to perform PHP procedures for packets on the multicast tree (e.g., to pop the TREE-SID transport label from received packets and forward the received packets toward any leaf routers with only the BGP PTA upstream assigned label on the multicast payload). In at least some example embodiments, where the multicast tree is formed based on the TREE-SID multicast solution, when a multicast packet including a multicast payload and an upstream assigned label (e.g., a BGP PTA upstream assigned label) but excluding a tree label (e.g., since it was popped by the upstream PH router) is received by a leaf router of the multicast tree based on use of PHP procedures on the upstream PH router of the multicast tree, the leaf router of the multicast tree may use the upstream assigned label to identify the virtual routing and forwarding (VRF) instance associated with the multicast tree (e.g., as per RFC 6513), may use the multicast payload under the upstream assigned label to find the outgoing interface(s) for the multicast packet in the VRF instance associated with the multicast tree, and may then forward the multicast payload over the outgoing interface(s) at the leaf router of the multicast tree. In at least some example embodiments, use of PHP on a multicast tree may be controlled by the PCE (e.g., automatically by the PCE such as where the PCE is configured to use PHP procedures for calculation of the multicast tree while assuming that the root router is advertising the BGP PTA upstream assigned label for the multicast tree to the leaf routers, manually based on configuration of the PCE by an operator to use PHP procedures for calculation of the multicast tree, or the like). In at least some example embodiments, a root router of the multicast tree may be configured to control use of PHP on a multicast tree (e.g., requesting that the PCE establish the multicast tree based on use of PHP and advertising the BGP PTA upstream assigned label for the multicast tree to the leaf routers). It will be appreciated that at least some such example embodiments may enable use of the TREE-SID multicast solution in networks in which leaf routers are unable to support PCE-PCC connectivity or the Path Computation Element Protocol (PCEP), may improve scalability for use of the TREE-SID multicast solution (e.g., supporting a significant reduction in load on the PCE for a multicast tree having a relatively large number of leaf routers for both the initial tree download as well as subsequent downloads of updates to the multicast tree), may provide resource savings (e.g., on the PCE by obviating the need for generation and sending of multicast tree configuration information to the PCCs operating as leaf routers, on the PCCs operating as leaf routers by obviating the need for the PCCs operating as leaf routers to receive and process multicast tree configuration information from the PCE and obviating the need for the PCCs operating as leaf routers to pop the tree label, or the like, as well as various combinations thereof), or the like, as well as various combinations thereof. It will be appreciated that these as well as various other example embodiments and advantages or potential advantages may be further understood by way of reference to the various figures, which are discussed further below.

FIG. 1 depicts an example embodiment of a communication system configured to support use of multicast for delivery of data.

The communication system 100 includes a communication network (CN) 110 that is configured to support multicasting of traffic from a multicast source (MS) 120 to a set of multicast hosts (MHs) 130. The CN 110 may support multicasting of traffic from MS 120 to ones of the MHs 130 that are members of a multicast group using a multicast tree established within CN 110 for the multicast group. The CN 110 includes a set of routers 111-1-111-10 (collectively, router 111) and a controller 112. The routers 111 are configured to support establishment of a multicast tree and forwarding of traffic via the multicast tree. The routers 111 may operate in various roles for supporting multicast communications, with a multicast tree generally including a root router, one or more transit routers, and one or more leaf routers. The controller 112 may be configured to control establishment of the multicast tree in the CN 110. The MS 120 and MHs 130 may be configured for handling various types of data which may be multicast via a multicast tree in the CN 110 (e.g., streaming media, shared data applications, bulk data transfers, or the like, as well as various combinations thereof).

The communication system 100 may be configured to support establishment and use of the multicast tree based on use of TREE-SID, which is a controller-driven multicast technology that is based on use of a controller (e.g., a Software Defined Networking (SDN) controller or other suitable type of controller) or other element (e.g., via command-line interface (CLI) or other suitable interface types) to calculate a multicast tree and instantiate the multicast tree within the communication network. In TREE-SID, a controller (e.g., controller 112) of the communication network (e.g., referred to as a Path Computation Element (PCE) in Segment Routing and TREE-SID) typically computes a multicast tree and downloads the multicast tree to routers of the communication network (e.g., routers 111 of communication network 110) which form part of the multicast tree (e.g., (namely, the root router, transit routers, and leaf routers of the multicast tree, which are referred to as Path Computation Clients (PCCs) in Segment Routing and TREE-SID). In TREE-SID, the multicast tree calculated from ROOT to LEAF may be referred to as a TREE-SID multicast tree or as a TREE-SID tree. In TREE-SID, the multicast tree may be a P2MP MPLS multicast tree (although it will be appreciated that other types of multicast trees may be supported). In TREE-SID, the multicast tree may be identified using a TREE-SID transport label (which also may be referred to as a TREE-SID P2MP transport label or, more generally, as a P2MP transport label, where the multicast tree is a P2MP multicast tree and, further, which also may be referred to more generally still as a tree transport label or a tree label), which is a label that identifies the multicast tree in the datapath. It is noted that the TREE-SID transport label may be configured such that, on the incoming interface of the node of the multicast tree, the label can identify the forwarding state (e.g., a forwarding entry) and, therefore, can identify the outgoing interfaces on the node of the multicast tree. In TREE-SID, the downloading of the multicast tree to the PCCs (again, the root router, transit routers, and the leaf routers) of the multicast tree is typically performed using mesh connectivity between the PCE and each of the PCCs; however, the use of this arrangement may not be viable where PCCs are unable to support PCE-PCC connectivity or PCEP and the use of this arrangement may place a relatively significant load on the PCE for a multicast tree having a relatively large number of leaf routers (e.g., for both the initial download of the multicast tree as well as subsequent downloads of updates to the multicast tree).

The communication system 100, including the routers 111 and the controller 112 of CN 110, may be configured to support establishment and use of the multicast tree based on use of a version of TREE-SID in which PHP is used. The communication system 100 may be configured to support establishment and use of the multicast tree based on use of a version of TREE-SID in which PHP is used to obviate a need for the PCE to download the multicast tree into the PCCs operating as leaf routers and, thus, which obviates a need for connectivity between the PCE and the PCCs operating as leaf routers (e.g., enabling use of TREE-SID where PCCs are unable to support PCE-PCC connectivity or PCEP, enabling use of TREE-SID where the multicast tree includes a relatively large number of leaf routers without introducing corresponding additional load on the PCE, or the like). This may provide significant savings in terms of computing resources (e.g., in terms of computations performed by the PCE and processing performed by PCCs operating as leaf routers), network resources (e.g., network resources needed for delivery of multicast configuration information from the PCE to PCCs for instantiation of the multicast tree in the network since multicast tree configuration information does not need to be delivered to PCCs operating as leaf routers), or the like, as well as various combinations thereof. The communication system 100, including the routers 111 and the controller 112 of the CN 110, may be configured to support establishment and use of the multicast tree, based on use of a version of TREE-SID in which PHP is used, as discussed further below.

The communication system 100, including the routers 111 and the controller 112 of CN 110, may be configured to support establishment of the multicast tree based on use of a version of TREE-SID in which PHP is used. It will be appreciated that establishment of the multicast tree based on use of a version of TREE-SID in which PHP is used may be further understood by way of reference to FIG. 2.

The controller 112 may be configured to support establishment of the multicast tree in CN 110 based on use of a version of TREE-SID in which PHP is used. The controller 112 may be configured to support establishment of the multicast tree in CN 110 based on use of a version of TREE-SID in which PHP is used based on a request by a root router of the multicast tree for use of PHP in the multicast tree.

The controller 112 may be configured to support establishment of the multicast tree in CN 110 by determining the multicast tree (e.g., determining the root router, the transit routers, and the leaf routers, as well as the connectivity between the various elements) and installing the multicast tree within the CN 110 (e.g., sending multicast tree configuration information to the root router and transit routers).

The controller 112 may determine the multicast tree based on multicast tree determination information. The multicast tree determination information may include network topology information for CN 110 and multicast tree root and leaf information for the multicast tree. The multicast tree root and leaf information for the multicast tree may include root router information for the router 111 operating as the root router of the multicast tree and leaf router information for the routers 111 operating as the leaves of the multicast tree.

The controller 112 may determine the network topology information for CN 110 in various ways. In at least some embodiments, for example, the controller 112 may determine the network topology information for CN 110 from one or more other systems or databases (e.g., a topology management system or other suitable system that has access to network topology information). In at least some embodiments, for example, the controller 112 may determine the network topology information for CN 110 from the CN 110. In at least some embodiments, for example, the controller 112 may determine the network topology information for CN 110 from the CN 110 based on use of Border Gateway Protocol—Link State (BGP-LS), or another suitable protocol, to obtain link state information from the routers 111 of CN 110.

The controller 112 may determine the multicast tree root and leaf information for the multicast tree in various ways. In at least some embodiments, for example, the controller 112 may receive the multicast tree root and leaf information for the multicast tree from the root router of the multicast tree (namely, one of the routers 111 that will operate as the root router of the multicast tree).

The router 111 operating as the root router of the multicast tree may determine root router information for the multicast tree, determine leaf router information for the leaf routers of the multicast tree, and provide the multicast tree root and leaf information for the multicast tree to the controller 112.

The router 111 operating as the root router of the multicast tree may determine root router information for the multicast tree and provide the root router information for the multicast tree to the controller 112. The root router information for the multicast tree may include a node identifier of the router 111 operating as the root router of the multicast tree. The root router information for the multicast tree may include an indication that the root router is operating in a root-and-receiver-only mode for the multicast tree. The root router information for the multicast tree may include any other root router information which may be used by the controller 112 to establish the multicast tree. The router 111 operating as the root router of the multicast tree may provide the root router information to the controller 112 independent of providing the leaf router information to the controller 112 or in conjunction with providing the leaf router information to the controller.

The router 111 operating as the root router of the multicast tree may determine leaf router information for the leaf routers of the multicast tree and provide the leaf router information for the leaf routers of the multicast tree to the controller 112. The leaf router information for the leaf routers of the multicast tree may include, for each leaf router, a node identifier of the router 111, an indication that router 111 is operating in a receiver-only mode for the multicast tree, or the like, as well as various combinations thereof.

The router 111 operating as the root router of the multicast tree may determine leaf router information for the leaf routers of the multicast tree by discovering the leaf routers of the multicast tree and obtaining the leaf router information for the leaf routers of the multicast tree based on the discovery of the leaf routers of the multicast tree. The router 111 operating as the root router of the multicast tree may discover leaf routers of the multicast tree in various ways. In at least some embodiments, for example, the router 111 operating as the root router of the multicast tree may discover the leaf routers of the multicast tree based on use of Multi-protocol BGP (MP-BGP) in conjunction with Multicast Virtual Private Network (MVPN) procedures. In at least some embodiments, for example, the router 111 operating as the root router of the multicast tree may discover the leaf routers of the multicast tree based on MP-BGP LEAF auto-discovery (AD) routes arriving at the root router from the leaf routers.

The router 111 operating as the root router of the multicast tree provides the leaf router information for the leaf routers of the multicast tree to the controller 112. The router 111 operating as the root router of the multicast tree may provide the leaf router information to the controller 112 in conjunction with providing the root router information to the controller 112 or independent of providing the root router information to the controller 112. The router 111 operating as the root router of the multicast tree may provide the leaf router information to the controller 112 as the leaf routers are discovered, in bulk, or the like, as well as various combinations thereof.

It will be appreciated that, while primarily presented herein with respect to embodiments in which the root router of the multicast tree is configured to provide multicast tree root and leaf information for the multicast tree to the controller that computes the multicast tree, in at least some embodiments the controller that computes the multicast tree may obtain the multicast tree root and leaf information for the multicast tree from one or more other sources (e.g., from one or more management systems, via a discovery procedure (e.g., MP-BGP (NG-MVPN)) procedures, based on manual entry of such information into the controller by an operator, or the like, as well as various combinations thereof). It is noted that, when a discovery procedure such as an MP-BGP (NG-MVPN)) procedure is used, the root router may still assign the BGP PTA upstream assigned label for the multicast tree and advertise the BGP PTA upstream assigned label (e.g., via MP-BGP) to the leaf routers. It is noted that, when manual entry of such information into the controller by an operator is used, the upstream assigned label may be assigned by the controller and distributed to the leaf routers directly (e.g., by the controller to the leaf routers) or indirectly (e.g., the controller provides the upstream assigned label to the root router of the multicast tree which may then advertise the upstream assigned label (e.g., via MP-BGP) to the leaf routers.

The router 111 operating as the root router of the multicast tree may control whether PHP is to be used on the multicast tree.

The router 111 operating as the root router of the multicast tree may determine whether PHP is to be used on multicast tree and provide an indication as to whether PHP is to be used on the multicast tree to the controller 112.

The router 111 operating as the root router of the multicast tree may determine whether PHP is to be used on multicast tree based on leaf router capability information (e.g., based on a determination that one or more leaf routers are not capable of supporting use of TREE-SID), based on a determination that a threshold number of leaf routers are associated with the multicast tree (e.g., for scalability of TREE-SID), or the like.

The router 111 operating as the root router of the multicast tree may provide the indication as to whether PHP is to be used on the multicast tree to the controller 112 in various ways.

The router 111 operating as the root router of the multicast tree may provide the indication as to whether PHP is to be used on the multicast tree to the controller 112 in the form of an indication of a request to use PHP on the multicast tree or an indication of an instruction to use PHP on the multicast tree.

The router 111 operating as the root router of the multicast tree may provide the indication as to whether PHP is to be used on the multicast tree to the controller 112 based on use of an arrangement in which use of PHP on multicast trees is set to OFF by default (e.g., in which case the router 111 operating as the root router of the multicast tree may provide an explicit indication that PHP is to be used on the given multicast tree) or based on use of an arrangement in which use of PHP on multicast trees is set to ON by default (e.g., in which case the router 111 operating as the root router of the multicast tree may provide an indication that PHP is to be used on the multicast tree by not including an explicit indication that PHP is not to be used on the given multicast tree).

The router 111 operating as the root router of the multicast tree may provide the indication as to whether PHP is to be used on the multicast tree to the controller 112 as part of an initial request for establishment of the multicast tree (which may or may not be independent of providing the multicast tree root and leaf information for the multicast tree to the controller 112), in conjunction with providing the multicast tree root and leaf information for the multicast tree to the controller 112 (e.g., along with the root router information, along with the leaf router information, or the like, as well as various combinations thereof), or the like.

The router 111 operating as the root router of the multicast tree may provide the indication as to whether PHP is to be used on the multicast tree to the controller 112 in various other ways.

It will be appreciated that, while primarily presented herein with respect to embodiments in which the root router of the multicast tree is configured to control use of PHP on the multicast tree, in at least some embodiments the use of PHP on the multicast tree may be controlled in other ways (e.g., automatically by the controller 112 such as where the controller 112 can be configured to use PHP procedures for calculation of the multicast tree while assuming that the root router is advertising the BGP PTA upstream assigned label for the multicast tree to the leaf routers, automatically by the controller 112 such as where the controller 112 can be configured to use PHP procedures for calculation of the multicast tree based on a determination by the controller 112 as to whether PHP can be used (e.g., based on leaf router capability information indicative as to whether the leaf routers of the multicast tree are capable of supporting TREE-SID), manually based on configuration of the controller 112 by an operator to use PHP procedures for calculation of the multicast tree, or the like, as well as various combinations thereof).

The controller 112 determines the multicast tree based on multicast tree determination information (namely, based on the network topology information for CN 110 and based on the multicast tree root and leaf information for the multicast tree). The multicast tree computed by the controller 112 specifies the root router of the multicast tree, the transit routers of the multicast tree, the leaf routers of the multicast tree, and the connectivity between these various elements of the multicast tree, thereby specifying the paths followed within the CN 110 by the traffic being multicast from the MS 120 to the ones of the MHs 130 that belong to the multicast group.

The controller 112, based on use of PHP in the multicast tree, determines the penultimate hop (PH) routers of the multicast trees. The PH routers of the multicast tree include any routers 111 of the multicast tree that operate as the penultimate hop on the multicast tree for at least one leaf router of the multicast tree. The PH routers of the multicast tree may include one or more of the transit routers of the multicast tree. It will be appreciated that a leaf router of the multicast tree also may be identified as a PH router if that leaf router is operating as a transit router and PH router for at least one other leaf router (although such leaf router will only be considered to be a PH router within the context of its role as a transit router and PH router, but not its role as a leaf router).

The controller 112 establishes the multicast tree in the CN 110. The controller 112 determines multicast tree configuration information for establishing the multicast tree in the CN 110 and provides the multicast tree configuration information to the CN for establishing the multicast tree in the CN 110. The multicast tree configuration information includes configuration information for the root router of the multicast tree, configuration information for the transit routers of the multicast tree, and configuration information for the PH routers of the multicast tree, but does not include configuration information for the leaf routers of the multicast tree since the use of PHP on the multicast tree obviates the need for configuration of the leaf routers of the multicast tree in order to establish the multicast tree within the CN 110.

The controller 112 determines the configuration information for the root router of the multicast tree and provides the configuration information for the root router of the multicast tree to the root router of the multicast tree. The configuration information for the root router of the multicast tree may include configuration information for enabling the root router to forward packets over the multicast tree (e.g., the outgoing label, the outgoing interfaces, and so forth). The controller 112 may provide the configuration information for the root router of the multicast tree to the root router of the multicast tree by downloading the configuration information for the root router of the multicast tree to the root router.

The controller 112 determines the configuration information for the transit routers of the multicast tree and provides the configuration information for the transit routers of the multicast tree to the transit routers of the multicast tree, respectively. The configuration information for the transit routers of the multicast tree may include configuration information for enabling the transit routers to forward packets over the multicast tree (e.g., the outgoing label, the outgoing interfaces, and so forth). The controller 112 may provide the configuration information for the transit routers of the multicast tree to the transit routers of the multicast tree by downloading the configuration information for the transit routers of the multicast tree to the transit routers.

The controller 112 determines the configuration information for the PH routers of the multicast tree and provides the configuration information for the PH routers of the multicast tree to the PH routers of the multicast tree, respectively. The configuration information for the PH routers of the multicast tree may include configuration information for enabling the PH routers to forward packets toward the leaf routers without including the TREE-SID label. For example, the configuration information for a PH router may include an Incoming Label Map (ILM) table entry indicative that the TREE-SID label of the multicast tree is to be popped from multicast packets prior to forwarding the multicast packets toward the leaf routers. For example, the configuration information for a PH router may include an ILM table entry indicative that the TREE-SID label of the multicast tree is to be swapped with an implicit null label (e.g., an ILM entry of <label x swap to label 3>, where label x is the TREE-SID label and label 3 is the implicit null label). The controller 112 may provide the configuration information for the PH routers of the multicast tree to the PH routers of the multicast tree by downloading the configuration information for the PH routers of the multicast tree to the transit routers.

The routers 111 operating as the leaf routers of the multicast tree, although not configured by the controller 112 (i.e., by the PCE within the context of TREE-SID), are still configured to support handling of multicast traffic on the multicast tree. The PH router that forwards multicast packets to a leaf router removes the TREE-SID label from the multicast packets before forwarding, such that the leaf router receives multicast packets including a multicast payload and a BGP upstream assigned PTA label (but without a TREE-SID label) and, thus, determines further forwarding of the multicast packets based on the BGP upstream assigned PTA label and the multicast payload rather than the TREE-SID. As a result, the routers 111 operating as the leaf routers of the multicast tree may be configured with mappings of a BGP PTA upstream assigned label for the multicast tree to a VRF for the multicast tree. The routers 111 operating as the leaf routers of the multicast tree may be configured, by the root router of the multicast tree, with a mapping of a BGP PTA upstream assigned label for the multicast tree to a VRF for the multicast tree. In at least some embodiments, for example, MVPN procedures on the root router of the multicast tree may use the label field in the Provider Multicast Service Interface (PMSI) Tunnel Attribute (PTA) in order to advertise to the leaf routers of the multicast tree a label (e.g., a BGP PTA upstream assigned label) that identifies a specific VRF instance of the multicast tree via its route target (RT). It will be appreciated that the procedure for assigning a PTA label is described in Section 12.2 of Request for Comment (RFC) 6513. The routers 111 operating as the leaf routers of the multicast tree receive, from the root router of the multicast tree, the mapping of the BGP PTA upstream assigned label for the multicast tree to the VRF for the multicast tree and store the mapping of the BGP PTA upstream assigned label for the multicast tree to the VRF for the multicast tree for use in handling multicast packets received from PH routers of the multicast tree.

The communication system 100, including the routers 111 and the controller 112 of CN 110, may be configured to support various other functions for supporting establishment of the multicast tree based on use of a version of TREE-SID in which PHP is used.

The communication system 100, including the routers 111 and the controller 112 of CN 110, may be configured to support use of the multicast tree based on use of a version of TREE-SID in which PHP is used. It will be appreciated that use of the multicast tree based on use of a version of TREE-SID in which PHP is used may be further understood by way of reference to FIG. 3.

The router 111 operating as the root router of the multicast tree receives a packet provided by MS 120 for delivery to MHs 130 of the multicast group. The packet may be referred to as a multicast PDU as the packet will be propagated via the multicast tree for the multicast group. The packet may be any type of packet which may be a multicast PDU that may be propagated via a multicast tree. For example, the packet may be an IP packet, an Ethernet frame, or the like. The router 111 forms a multicast packet, for propagation via the multicast tree for the multicast group, by pushing a BGP PTA upstream assigned label onto the packet and pushing a TREE-SID label onto the BGP PTA upstream assigned label. It will be appreciated that the packet (multicast PDU) received by the router 111 operating as the root router also may be referred to as the multicast payload of the multicast packet.

The routers 111 operating as transit routers of the multicast tree receive multicast packets from upstream routers of the multicast tree, perform label swap operations based on the outer label (namely, the TREE-SID label), and forward the multicast packets to downstream routers of the multicast tree. In this manner, the original packet received by the router 111 operating as the root router of the multicast tree is eventually received by each of the PH routers of the multicast tree.

The routers 111 operating as PH routers of the multicast tree are configured to receive multicast packets from upstream routers (e.g., the router 111 operating as the root router of the multicast tree or a transit router 111 of the multicast tree) and perform processing for delivering the multicast payloads to routers 111 operating as leaf routers of the multicast tree. A router 111 operating as a PH router of the multicast tree receives a multicast packet including a multicast payload, a BGP PTA upstream assigned label (inner label), and a TREE-SID label (outer label), pops the TREE-SID label, and forwards the resulting multicast packet (namely, the multicast payload having the BGP PTA upstream assigned label at the top of its MPLS label stack) toward any leaf routers of the multicast tree with which the PH router is associated. The PH router may pop the TREE-SID label based on an ILM table entry indicative that the TREE-SID label of the multicast tree is to be swapped with an implicit null label (e.g., an ILM entry of <label x swap to label 3>, where label x is the TREE-SID label and label 3 is the implicit null label).

The routers 111 operating as leaf routers of the multicast tree are configured to receive multicast packets from PH routers and perform processing for forwarding the multicast payloads of the multicast packets toward MHs 130. A router 111 operating as a leaf router of the multicast tree receives, from a router 111 operating as a PH router based on use of PHP procedures on the PH router, a multicast packet including a multicast payload and a BGP PTA upstream assigned label (and without a TREE-SID label). The router 111 operating as a leaf router of the multicast tree uses the BGP PTA upstream assigned label of the multicast packet to identify the virtual routing and forwarding (VRF) instance associated with the multicast tree. The router 111 operating as a leaf router of the multicast tree uses the multicast payload (e.g., the IP header of the multicast PDU which remains after the BGP PTA upstream assigned label is popped) to find the outgoing interface(s) for the multicast packet in the VRF instance associated with the multicast tree. The router 111 operating as a leaf router of the multicast tree then forwards the multicast payload over the outgoing interface(s) for propagation toward one or more MHs 130 of the multicast group.

It will be appreciated that, although primarily presented herein with respect to specific types, numbers, and arrangements of devices, communication system 100 may include various other types, numbers, and arrangements of devices.

Figure 2:
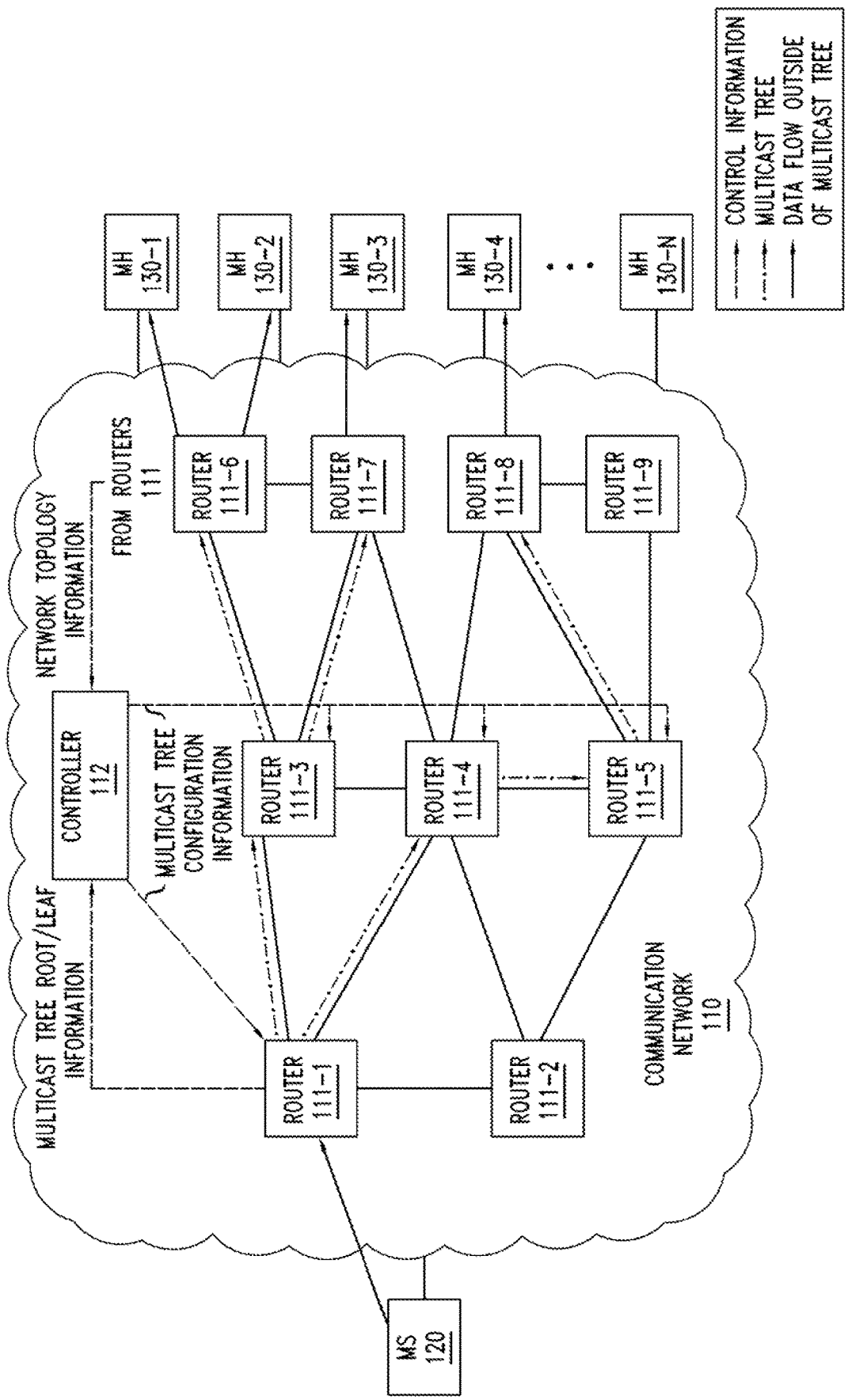
FIG. 2 depicts an example embodiment of the communication system of FIG. 1 for illustrating various example embodiments associated with establishment of the multicast tree based on use of a version of TREE-SID in which PHP is used.

FIG. 2 depicts an example embodiment of the communication system of FIG. 1 for illustrating various example embodiments associated with establishment of the multicast tree based on use of a version of TREE-SID in which PHP is used. As depicted in FIG. 2, controller 112 receives multicast tree determination information, determines the multicast tree for the multicast group based on the multicast tree determination information, and installs the multicast tree with CN 110. The controller 112 receives network topology information from routers 111 and multicast tree root and leaf information for the multicast tree from router 111-1 which is the root router of the multicast tree. The multicast tree root and leaf information indicates that router 111-1 is the root router of the multicast tree and that routers 111-6-111-8 are the leaf routers of the multicast tree and, further, that PHP is to be used for the multicast tree. The determination and establishment of the multicast tree is based on a version of TREE-SID configured to use PHP. The controller 112 computes the multicast tree based on the multicast tree determination information and determines the PH routers of the multicast tree. In the example of FIG. 2, the controller 112 determines that the multicast tree includes routers 111-1, 111-3, 111-4, 111-5, 111-6, 111-7, and 111-8 (with router 111-1 being the root router, routers 111-3, 111-4, and 111-5 being transit routers, and routers 111-6, 111-7, and 111-8 being leaf routers). The controller 112 determines the PH routers of the multicast tree are router 111-3 (which is directly serving leaf routers 111-6 and 111-7 on the multicast tree) and router 1115 (which is directly serving leaf router 111-8 on the multicast tree). The controller 112 establishes the multicast tree in CN 110 by sending multicast tree configuration information to each of the routers 111 of the multicast tree with the exception of the leaf routers of the multicast tree (illustratively, to routers 111-1, 111-3, 111-4, and 111-5, but not to routers 111-6, 111-7, or 111-8). The multicast tree configuration information is configured to enable router 111-1 to operate as the root router of the multicast tree, to enable router 111-4 to operate as a transit router of the multicast tree, and to enable routers 111-3 and 111-5 to operate as PH routers configured to perform PHP functions on the multicast tree. It will be appreciated that the routers 111 and the controller 112 may be configured to perform various other functions for supporting establishment of the multicast tree based on use of a version of TREE-SID in which PHP is used.

Figure 3:
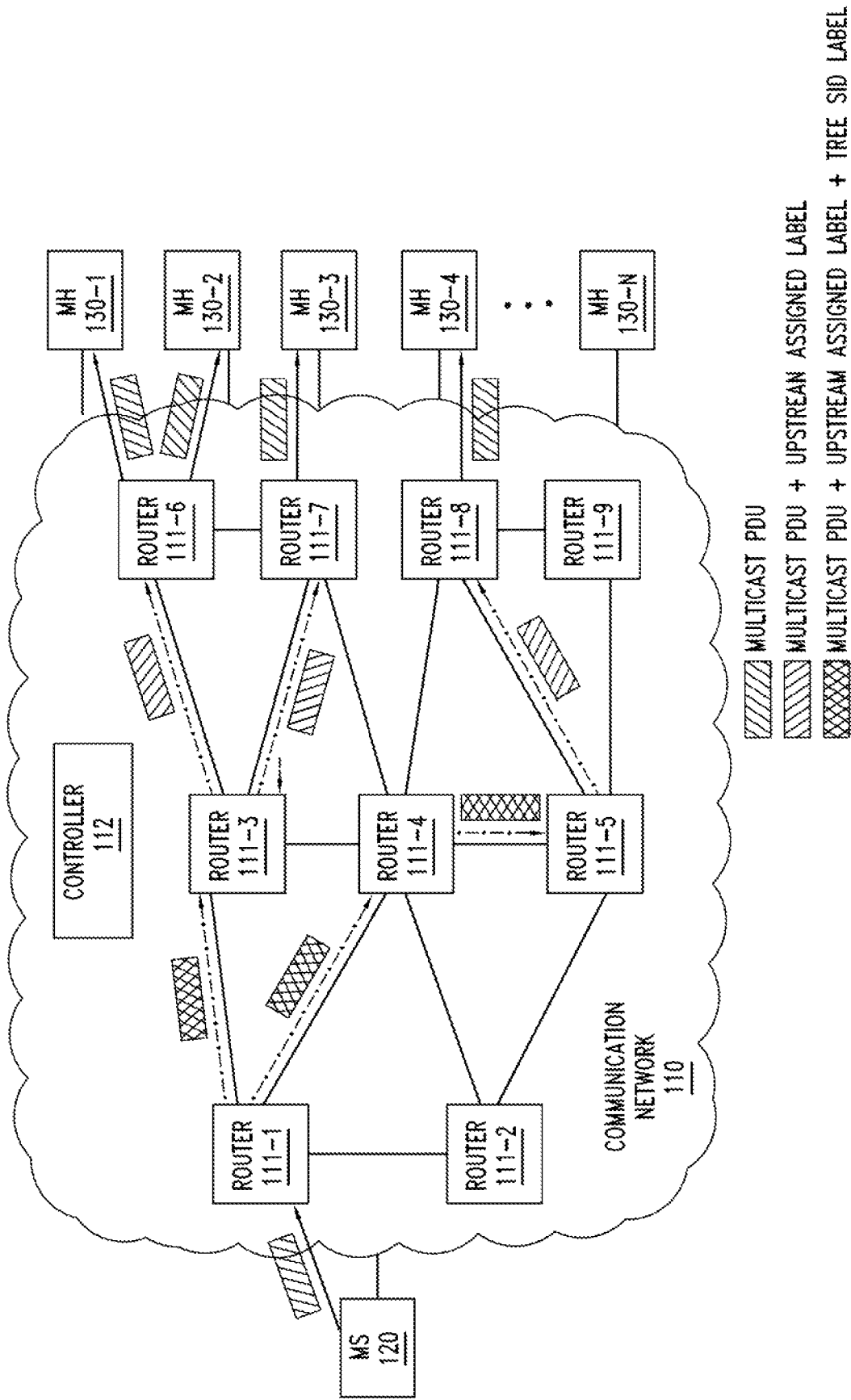
FIG. 3 depicts an example embodiment of the communication system of FIG. 1 for illustrating various example embodiments associated with use of the multicast tree based on use of a version of TREE-SID in which PHP is used.

FIG. 3 depicts an example embodiment of the communication system of FIG. 1 for illustrating various example embodiments associated with use of the multicast tree based on use of a version of TREE-SID in which PHP is used. As depicted in FIG. 3, a packet from MS 120 is delivered to MHs 130-1-130-4 via the multicast tree established in CN 110 (as illustrated with respect to FIG. 2). The MS 120 sends a packet, which also may be referred to as a multicast PDU, to router 111-1 which is the root router of the multicast tree. The router 111 operating as the root router of the multicast tree receives the packet provided by MS 120 and forms a multicast packet, for propagation via the multicast tree for the multicast group, by pushing a BGP PTA upstream assigned label onto the packet and pushing a TREE-SID label of the multicast tree onto the BGP PTA upstream assigned label (with the multicast PDU becoming the multicast payload of the multicast packet). The router 111-1 operating as the root router of the multicast tree provides the multicast packet to both router 111-3 and router 111-4. The router 111-3 is a PH router of the multicast tree for leaf routers 111-6 and 111-7 and, thus, pops the TREE-SID label based on an ILM table entry indicative that the TREE-SID label of the multicast tree is to be swapped with an implicit null label (e.g., an ILM entry of <label x swap to label 3>, where label x is the TREE-SID label and label 3 is the implicit null label) and forwards the multicast packet toward leaf routers 111-6 and 111-7. The router 111-4 is a transit router of the multicast tree and, thus, performs a label swap operation based on the outer label (namely, the TREE-SID label) forwards the multicast packet to the router 111-5. The router 111-5 is a PH router of the multicast tree for leaf router 111-8 and, thus, pops the TREE-SID label based on an ILM table entry indicative that the TREE-SID label of the multicast tree is to be swapped with an implicit null label (e.g., an ILM entry of <label x swap to label 3>, where label x is the TREE-SID label and label 3 is the implicit null label) and forwards the multicast packet toward leaf router 111-8. The leaf routers 111-6, 111-7, and 111-8 each receive multicast packets including the multicast payload and the BGP PTA upstream assigned label (but without a TREE-SID label popped by the routers 111-3 and 111-5) and determine forwarding of the multicast packets based on the BGP PTA upstream assigned label and the multicast payload (e.g., using the BGP PTA upstream assigned label of the multicast packet to identify the VRF instance and using the multicast payload to find the outgoing interface(s) over which the multicast payload is to be sent. The leaf router 111-6 forwards the multicast payload to MHs 130-1 and 130-2, the leaf router 111-7 forwards the multicast payload to MH 130-3, and the leaf router 111-8 forwards the multicast payload to MH 130-4.

It will be appreciated that, although FIGS. 1-3 are primarily presented with respect to use of specific elements and protocols, establishment and use of a multicast tree based on use of a version of TREE-SID in which PHP is used may be supported using various other elements and protocols.

Figure 4:
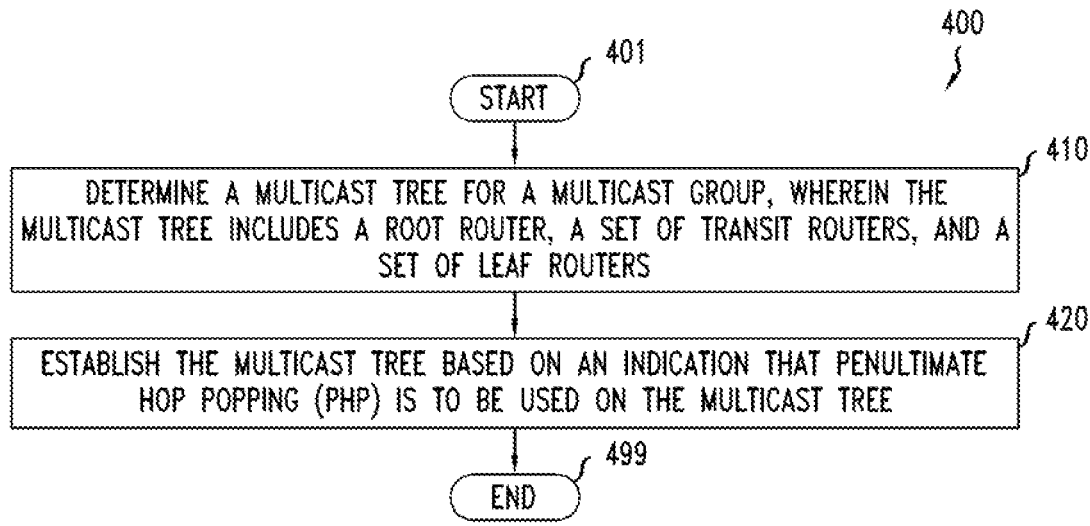
FIG. 4 depicts an example embodiment of a method for use by a controller to support use of multicast for delivery of data based on use of a version of TREE-SID in which PHP is used.

FIG. 4 depicts an example embodiment of a method for use by a controller to support use of multicast for delivery of data based on use of a version of TREE-SID in which PHP is used. It will be appreciated that, although primarily presented as being performed serially, at least a portion of the functions of method 400 may be performed contemporaneously or in a different order than as presented with respect to FIG. 4. At block 401, method 400 begins. At block 410, determine a multicast tree for a multicast group, wherein the multicast tree includes a root router, a set of transit routers, and a set of leaf routers. At block 420, establish the multicast tree based on an indication that penultimate hop popping (PHP) is to be used on the multicast tree. At block 499, method 400 ends. It will be appreciated that various functions presented herein within the context of FIGS. 1-3 may be supported within the context of method 400 of FIG. 4.

Figure 5:
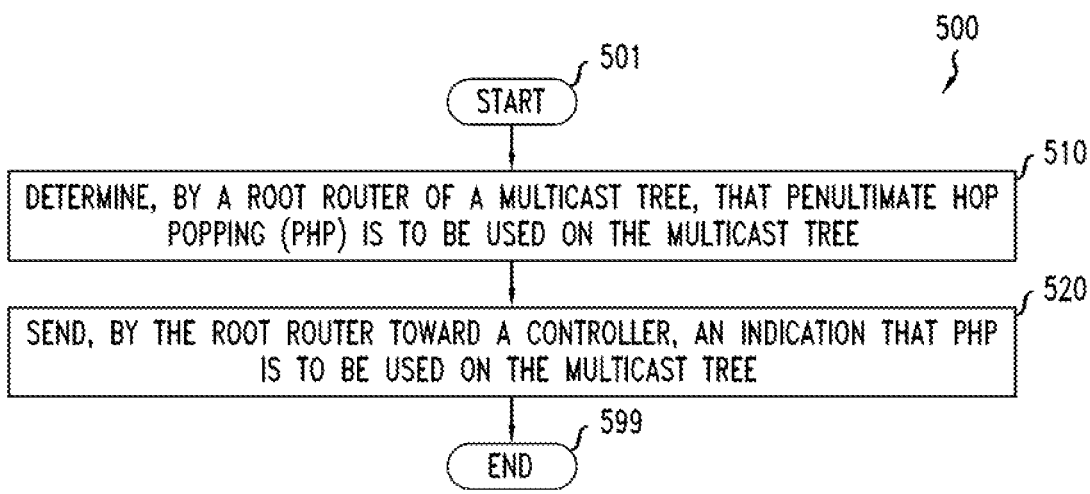
FIG. 5 depicts an example embodiment of a method for use by root router of a multicast tree to support use of multicast for delivery of data based on use of a version of TREE-SID in which PHP is used.

FIG. 5 depicts an example embodiment of a method for use by root router of a multicast tree to support use of multicast for delivery of data based on use of a version of TREE-SID in which PHP is used. It will be appreciated that, although primarily presented as being performed serially, at least a portion of the functions of method 500 may be performed contemporaneously or in a different order than as presented with respect to FIG. 5. At block 501, method 500 begins. At block 510, determine, by a root router of a multicast tree, that penultimate hop popping (PHP) is to be used on the multicast tree. At block 520, send, by the root router toward a controller, an indication that PHP is to be used on the multicast tree. At block 599, method 500 ends. It will be appreciated that various functions presented herein within the context of FIGS. 1-3 may be supported within the context of method 500 of FIG. 5.

Figure 6:
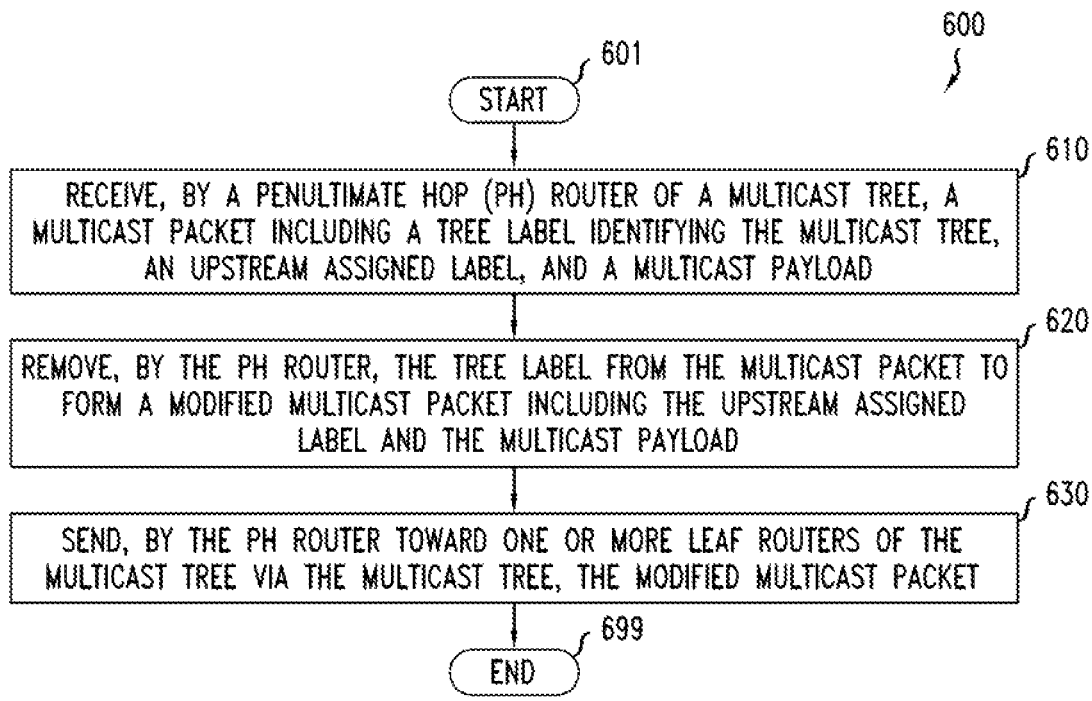
FIG. 6 depicts an example embodiment of a method for use by PH router of a multicast tree to support use of multicast for delivery of data based on use of a version of TREE-SID in which PHP is used.

FIG. 6 depicts an example embodiment of a method for use by PH router of a multicast tree to support use of multicast for delivery of data based on use of a version of TREE-SID in which PHP is used. It will be appreciated that, although primarily presented as being performed serially, at least a portion of the functions of method 600 may be performed contemporaneously or in a different order than as presented with respect to FIG. 6. At block 601, method 600 begins. At block 610, receive, by a penultimate hop (PH) router of a multicast tree, a multicast packet including a tree label identifying the multicast tree, an upstream assigned label, and a multicast payload. At block 620, remove, by the PH router, the tree label from the multicast packet to form a modified multicast packet including the upstream assigned label and the multicast payload. At block 630, send, by the PH router toward one or more leaf routers of the multicast tree via the multicast tree, the modified multicast packet. At block 699, method 600 ends. It will be appreciated that various functions presented herein within the context of FIGS. 1-3 may be supported within the context of method 600 of FIG. 6.

Figure 7:
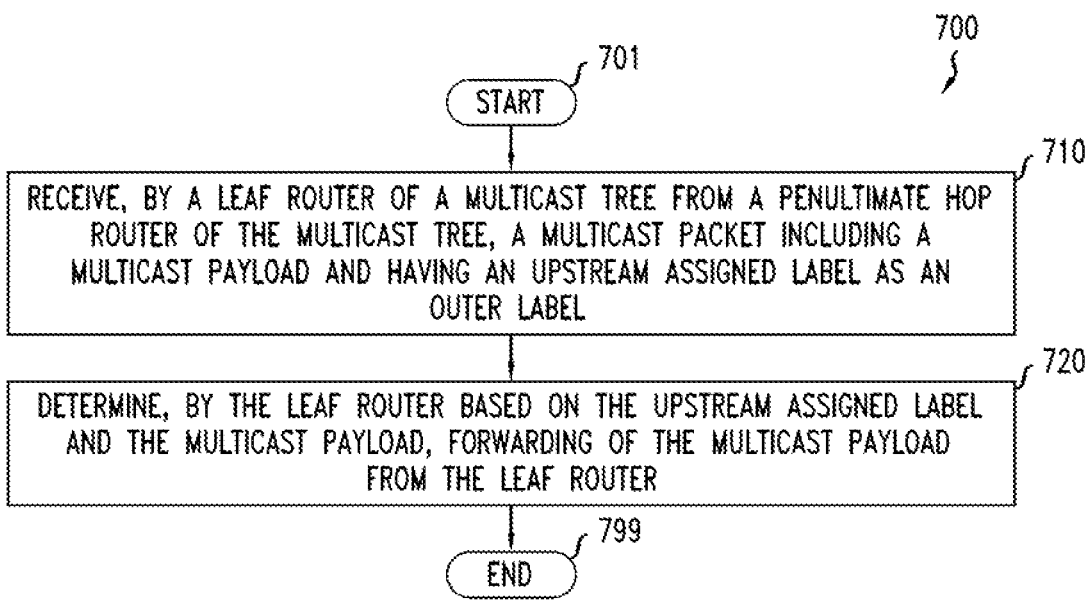
FIG. 7 depicts an example embodiment of a method for use by leaf router of a multicast tree to support use of multicast for delivery of data based on use of a version of TREE-SID in which PHP is used.

FIG. 7 depicts an example embodiment of a method for use by leaf router of a multicast tree to support use of multicast for delivery of data based on use of a version of TREE-SID in which PHP is used. It will be appreciated that, although primarily presented as being performed serially, at least a portion of the functions of method 700 may be performed contemporaneously or in a different order than as presented with respect to FIG. 7. At block 701, method 700 begins. At block 710, receive, by a leaf router of a multicast tree from a penultimate hop router of the multicast tree, a multicast packet including a multicast payload and having an upstream assigned label as an outer label. At block 720, determine, by the leaf router based on the upstream assigned label and the multicast payload, forwarding of the multicast payload from the leaf router. At block 799, method 700 ends. It will be appreciated that various functions presented herein within the context of FIGS. 1-3 may be supported within the context of method 700 of FIG. 7.

Various example embodiments for supporting multicast may provide various advantages or potential advantages. For example, various example embodiments for supporting multicast may, for multicast solutions that are based on TREE-SID (e.g., in which a PCE computes a multicast tree and downloads the multicast tree to PCCs), obviate a need for the PCE to download the multicast tree to PCCs operating as leaf routers in the multicast tree, thereby providing savings in terms of computations performed by the PCE, network resources needed for delivery of multicast configuration information from the PCE to PCCs for instantiation of the multicast tree in the network since multicast tree configuration information does not need to be delivered to PCCs operating as leaf routers, processing performed by the PCCs operating as leaf routers, and so forth. It will be appreciated, at least based on the foregoing, that various embodiments presented herein may be particularly well-suited for use where the leaf routers of the multicast tree are configured as leaf-only routers since these leaf-only routers will not be discovered via MP-BGP (NG-MVPN) procedures and will not be configured as root routers via the controller and, further, since there will not be any need for PCE-PCC communications (or use of the associated PCEP protocol) between the PCE and the leaf-only PCCs. Various example embodiments for supporting multicast may provide various other advantages or potential advantages.

It will be appreciated that, although primarily presented herein within the context of embodiments in which the multicast tree is a P2MP MPLS-based multicast tree, various example embodiments presented herein may use or may be adapted for use in supporting various other types of multicast trees (e.g., P2MP trees other than P2MP MPLS-based multicast trees, MPLS multicast trees other than P2MP MPLS-based multicast trees, and so forth). Accordingly, it will be appreciated various references herein to P2MP MPLS specific terms (e.g., P2MP MPLS multicast trees, P2MP multicast trees, MPLS multicast trees, and so forth) may be referred to more generally (e.g., P2MP MPLS multicast trees may be referred to more generally as MPLS multicast trees, P2MP MPLS multicast trees may be referred to more generally as P2MP multicast trees, P2MP MPLS multicast trees may be referred to more generally as multicast trees, and so forth).

It will be appreciated that, although primarily presented herein within the context of embodiments in which the multicast tree is based on TREE-SID, various example embodiments presented herein may use or may be adapted for use in supporting multicast trees based on various other types of multicast solutions (e.g., other than TREE-SID). Accordingly, it will be appreciated various references herein to TREE-SID specific terms (e.g., TREE-SID trees, TREE-SID P2MP transport labels, and so forth) may be referred to more generally (e.g., TREE-SID trees may be referred to more generally as multicast trees, TREE-SID P2MP transport labels may be referred to more generally as P2MP transport labels, tree transport labels, or tree labels, and so forth).

Figure 8:
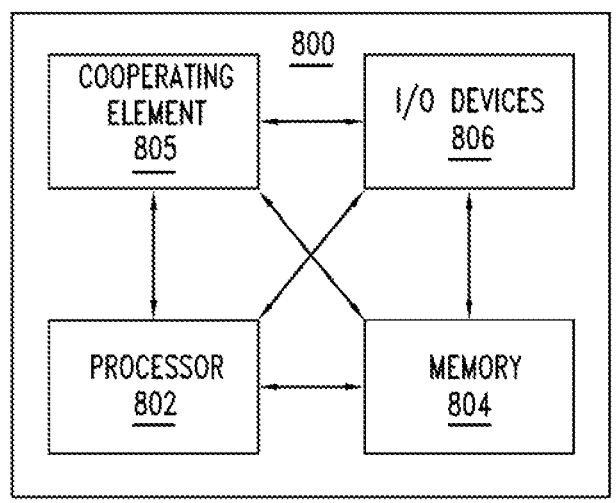
FIG. 8 depicts an example embodiment a computer suitable for use in performing various functions presented herein.

FIG. 8 depicts an example embodiment of a computer suitable for use in performing various functions described herein.

The computer 800 includes a processor 802 (e.g., a central processing unit, a processor having a set of processor cores, a processor core of a processor, or the like) and a memory 804 (e.g., a random access memory, a read only memory, or the like). The processor 402 and the memory 804 may be communicatively connected. The computer 800 may include at least one processor and at least one memory including program code, wherein the at least one memory and the program code are configured to, with the at least one processor, cause the apparatus to perform various functions presented herein.

The computer 800 also may include a cooperating element 805. The cooperating element 805 may be a hardware device. The cooperating element 805 may be a process that can be loaded into the memory 804 and executed by the processor 802 to implement functions as discussed herein (in which case, for example, the cooperating element 805 (including associated data structures) can be stored on a non-transitory computer-readable storage medium, such as a storage device or other storage element (e.g., a magnetic drive, an optical drive, or the like)).

The computer 800 also may include one or more input/output devices 806. The input/output devices 806 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 800 may represent a general architecture and functionality suitable for implementing functional elements described herein, portions of functional elements described herein, or the like, as well as various combinations thereof. For example, computer 800 may provide a general architecture and functionality that is suitable for implementing one or more elements presented herein, such as a router 111 or portion thereof, a controller 112 or portion thereof, an MS 120 or a portion thereof, an MH 130 or a portion thereof, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory storing instructions that, when executed by the at least one processor, cause the apparatus to at least:
      receive, by a penultimate hop router of a multicast tree, a multicast packet including a multicast payload, an upstream assigned label, and a tree label identifying the multicast tree;
      remove, by the penultimate hop router based on a rule indicative that the tree label is to be swapped with an implicit null label, the tree label from the multicast packet to form a modified multicast packet; and
      send, by the penultimate hop router toward one or more leaf routers of the multicast tree via the multicast tree, the modified multicast packet.

2. The apparatus of claim 1, wherein the tree label is removed from the multicast packet by popping the tree label from the multicast packet.

3. The apparatus of claim 1, wherein the rule indicative that the tree label is to be swapped with the implicit null label is received from a controller.

4. The apparatus of claim 1, wherein the tree label is a TREE-SID transport label.

5. The apparatus of claim 1, wherein the upstream assigned label maps to a virtual routing and forwarding (VRF) instance of the multicast tree.

6. The apparatus of claim 1, wherein the upstream assigned label is a Border Gateway Protocol (BGP) Provider Multicast Service Interface (PMSI) Tunnel Attribute (PTA) label.

7. A non-transitory computer readable medium comprising program instructions which, when executed by an apparatus, cause the apparatus to:
   receive, by a penultimate hop router of a multicast tree, a multicast packet including a multicast payload, an upstream assigned label, and a tree label identifying the multicast tree;
   remove, by the penultimate hop router based on a rule indicative that the tree label is to be swapped with an implicit null label, the tree label from the multicast packet to form a modified multicast packet; and
   send, by the penultimate hop router toward one or more leaf routers of the multicast tree via the multicast tree, the modified multicast packet.

8. The non-transitory computer readable medium of claim 7, wherein the tree label is removed from the multicast packet by popping the tree label from the multicast packet.

9. The non-transitory computer readable medium of claim 7, wherein the rule indicative that the tree label is to be swapped with the implicit null label is received from a controller.

10. The non-transitory computer readable medium of claim 7, wherein the tree label is a TREE-SID transport label.

11. The non-transitory computer readable medium of claim 7, wherein the upstream assigned label maps to a virtual routing and forwarding (VRF) instance of the multicast tree.

12. The non-transitory computer readable medium of claim 7, wherein the upstream assigned label is a Border Gateway Protocol (BGP) Provider Multicast Service Interface (PMSI) Tunnel Attribute (PTA) label.

13. A method, comprising:
   receiving, by a penultimate hop router of a multicast tree, a multicast packet including a multicast payload, an upstream assigned label, and a tree label identifying the multicast tree;
   removing, by the penultimate hop router based on a rule indicative that the tree label is to be swapped with an implicit null label, the tree label from the multicast packet to form a modified multicast packet; and
   sending, by the penultimate hop router toward one or more leaf routers of the multicast tree via the multicast tree, the modified multicast packet.

14. The method of claim 13, wherein the tree label is removed from the multicast packet by popping the tree label from the multicast packet.

15. The method of claim 13, wherein the rule indicative that the tree label is to be swapped with the implicit null label is received from a controller.

16. The method of claim 13, wherein the tree label is a TREE-SID transport label.

17. The method of claim 13, wherein the upstream assigned label maps to a virtual routing and forwarding (VRF) instance of the multicast tree.

18. The method of claim 13, wherein the upstream assigned label is a Border Gateway Protocol (BGP) Provider Multicast Service Interface (PMSI) Tunnel Attribute (PTA) label.

\* \* \* \* \*